United States Patent [19]

Seliber

[11] 3,870,116
[45] Mar. 11, 1975

[54] LOW POLLUTION AND FUEL CONSUMPTION FLYWHEEL DRIVE SYSTEM FOR MOTOR VEHICLES

[76] Inventor: Joseph Seliber, 313 Hibbard Rd., Wilmette, Ill. 60091

[22] Filed: Aug. 15, 1973

[21] Appl. No.: 388,637

[52] U.S. Cl. ............................................. 180/54 R
[51] Int. Cl. .............................................. B60k 9/04
[58] Field of Search ........ 180/54 R, 54 F, 55, 65 R, 180/66 R, 1 R, 15; 74/572, 751, 859

[56] References Cited
UNITED STATES PATENTS

| 2,803,151 | 8/1957 | Clerk | 74/751 |
| 2,935,899 | 5/1960 | Nallinger | 180/1 R X |
| 3,641,843 | 2/1972 | Lemmens | 74/751 |
| 3,672,244 | 6/1972 | Nasvytis | 74/859 |
| 3,734,222 | 5/1973 | Bardwick | 180/54 R |

Primary Examiner—Lloyd L. King
Assistant Examiner—Randolph A. Reese
Attorney, Agent, or Firm—Edward R. Lowndes

[57] ABSTRACT

An automotive vehicle propulsion system of the type that employs an energy storing flywheel and which, when operating under continuously prevailing urban conditions, supplies motive power to the vehicle solely by kinetic energy derived from the flywheel when the latter has attained a predetermined minimum speed, thus allowing the vehicle engine to be disconnected from the flywheel and disabled by ignition cutoff. When the flywheel falls below such minimum speed, the engine is restarted, connected to the flywheel, and operates with low exhaust emission and fuel consumption at constant speed and high load for flywheel regeneration purposes. The system, when operating under rural conditions within a relatively high speed cruising range, bypasses the flywheel and attains a direct drive from the engine to the vehicle wheels but has associated therewith means whereby flywheel assist power may be imposed upon such direct drive for rapid vehicle accleration.

A method which is inherent in the system consists in applying power continuously to the flywheel, discontinuing operation of the engine whenever flywheel speed reaches a predetermined maximum, and restarting the engine whenever flywheel speeds drop below a predetermined minimum, while withdrawing portions of stored flywheel energy from the flywheel and applying the same to the traction wheels while the flywheel is within the range defined by such maximum and minimum speed.

8 Claims, 3 Drawing Figures

PATENTED MAR 11 1975

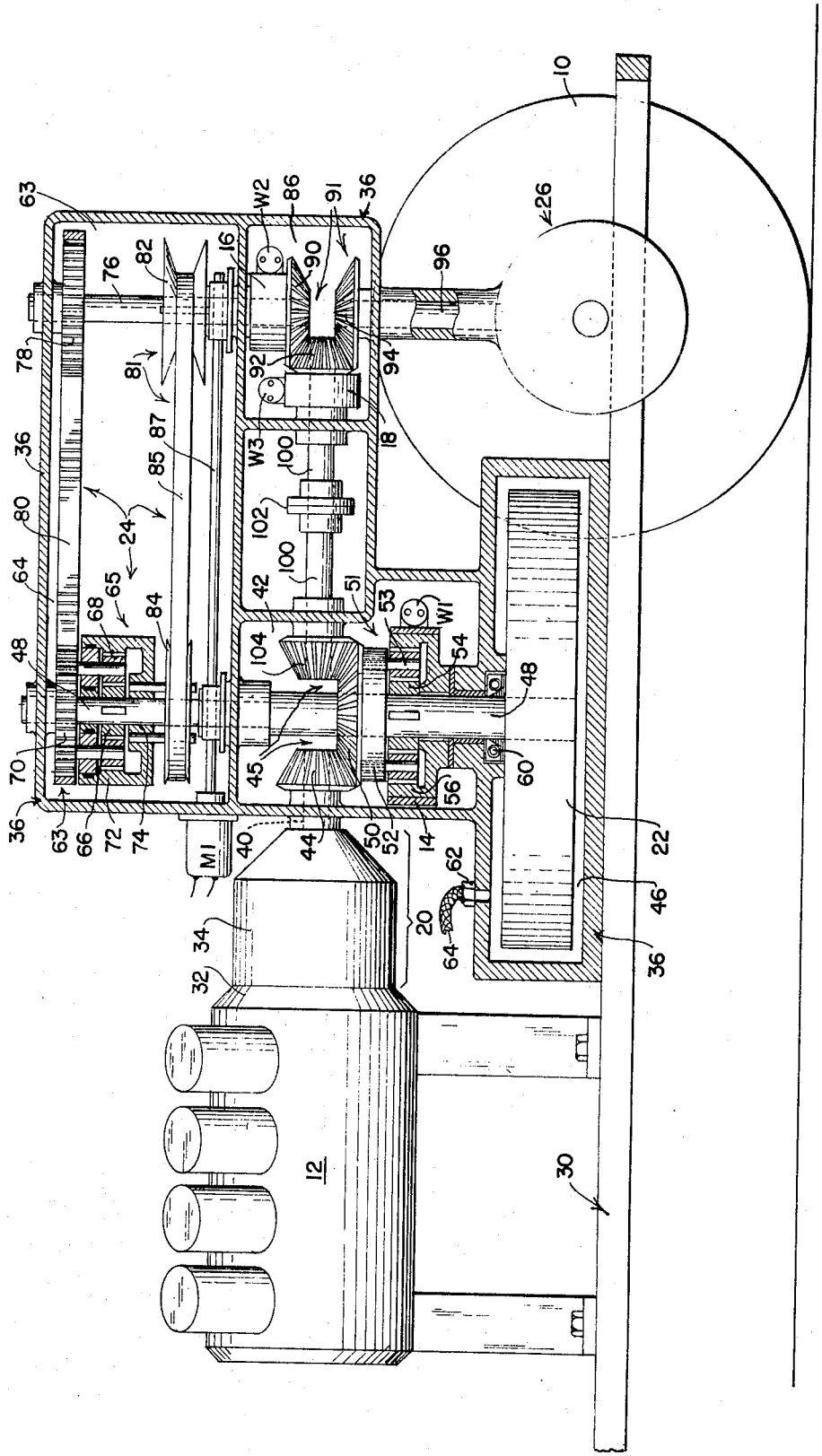

LOW POLLUTION AND FUEL CONSUMPTION FLYWHEEL DRIVE SYSTEM FOR MOTOR VEHICLES

The present invention relates to an improved vehicle propulsion system of the type that is commonly known as a hybrid system and which is characterized by the fact that two or more energy sources are variously employed for vehicle propulsion purposes. More specifically, the invention is concerned with a hybrid propulsion system which, in addition to the usual combustion engine, employs an energy-storing flywheel as a source of energy, the engine and flywheel being associated with each other in a novel manner which results in both improved fuel economy and a reduction of air pollution. Heat engine-flywheel hybrid propulsion systems are known and offer some improvement in fuel economy and emissions. However they are not generally in use because of the lack of appreciation for the potential benefits to be gained. It is also true that there are practical problems such as excessive flywheel weight and the high cost of efficient variable speed transmissions.

The hybrid propulsion system of the invention utilizes the principle of operating a vehicular engine at constant speed and high brake mean effective pressure. Such operation of a vehicle in hybrid propulsion of the type under consideration is novel and advantgeous and results in the saving of substantial amounts of fuel, as well as a reduction of emissions during normal urban use.

Another advantage of the present system is that for limited distances the vehicle produces zero emissions. This is particularly important in urban communities where pollution is most damaging. Zero emissions permit the vehicle to enter and leave a central business district without generating emissions.

The invention also provides significant improvement in fuel economy and emissions when the vehicle is operating at high speeds. Such operation occurs, for example, on unobstructed roads and rural highways. The primary reason for this improvement is that the heat engine can be designed solely for high speed operation rather than for the wide range of engine speed required from conventional engines.

Other important features of the present invention are a reduction in the power rating of the heat engine for identical performance for the same size vehicle; longer engine life; and dynamic braking to recover much of the decelerating energy of the vehicle and convert it into flywheel energy from whence it can be reused subsequently for acceleration and cruising.

The provision of a propulsion system such as has briefly been outlined above constitutes the principal object of the present invention and, in carrying out this object, the invention contemplates the utilization of a rotary inertia member in the form of an energy-absorbing flywheel, together with novel selectively operable variable speed power train components connecting the same to the engine and to the vehicle drive wheels. These power train components are capable of being selected for operation of the vehicle in a manner which will hereinafter be referred to as the "urban mode" wherein, when the vehicle is operating in such mode, the wheels are driven solely by kinetic energy derived from the flywheel, thus allowing the engine to be disconnected from the flywheel and the ignition circuit thereof interrupted so that during such use of stored energy for driving the vehicle no gaseous emissions of any sort take place.

In the urban mode a variable ratio transmission means which extends between the flywheel and the vehicle wheels is operated so as to increase or decrease vehicle speed substantially in the same manner as changes in the speed of conventional engine driven vehicles are produced. This urban mode of vehicle propulsion is available during such time as the flywheel maintains a predetermined minimum rotational speed and, when it falls below such minimum speed, the engine is again started and connected to the flywheel which then offers a substantially constant and unvarying load for flywheel recharging purposes and which therefore does not cause excessive fuel consumption. It is well-known that operating an engine at wide open throttle and moderate speeds produces the minimum brake specific fuel consumption, i.e. pounds of fuel per brake horsepower-hour. Conversely operating a heat engine at light loads produces a high specific fuel consumption primarily because of the relatively low mechanical efficiency at part load. Thus in the urban mode the engine is either not operating at all and hence producing zero emissions, or it is operating at constant power where specific fuel consumption and thermal efficiency are best, and emissions of carbon monoxide and hydrocarbons are minimized.

The power train components of the propulsion system of the present invention are also capable of being selected for operation of the vehicle in a manner which will hereinafter be referred to as the "rural mode." In such mode, within a relatively high speed cruising range, an additional power train component bypasses the flywheel and establishes a direct drive between the engine and the vehicle wheels. Also, the engine is disconnected from the flywheel which may continue to rotate idly as a source of stored energy. This rural mode of operation is intended for relatively high speed cruising as for example above 60 mph. If at any time vehicle speed drops below such speed, the power train component which connects the flywheel to the vehicle wheels may be activated to establish a flywheel assist for the attainment of rapid vehicle acceleration or deceleration.

Other objects and advantages of the invention, not at this time enumerated, will become readily apparent as the nature of the invention is better understood.

In the accompanying two sheets of drawings forming a part of this specification, one illustrative and preferred embodiment of the invention has been disclosed.

In these drawings:

FIG. 3 is a sectional view taken substantially on the line 3—3 of FIG. 2.

Figure 1:
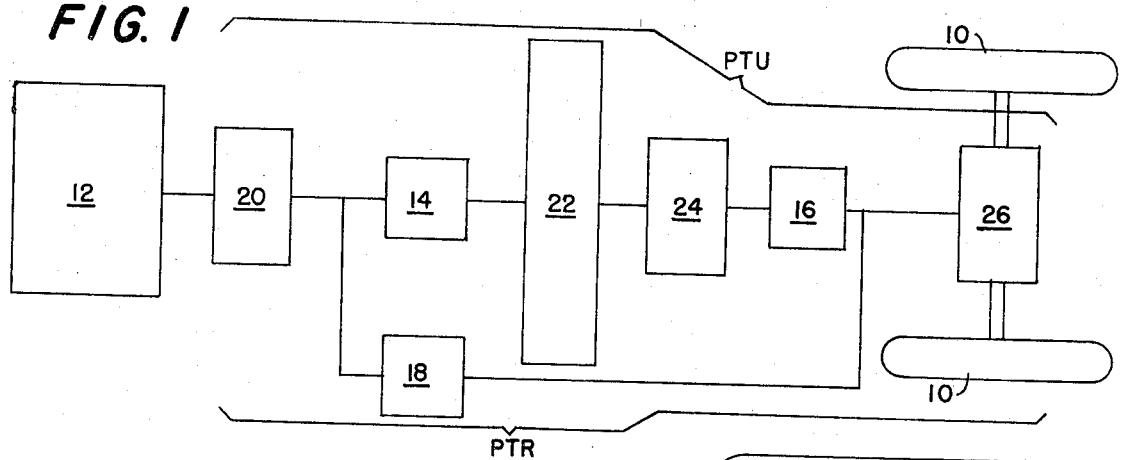
FIG. 1 is a block diagram of a vehicle propulsion system embodying the principles of the present invention.

Referring now to the drawings in detail and in particular to FIG. 1 wherein a vehicle power system which is illustrative of the basic principles of the present invention is schematically shown, the output of such system being applied to the drive or traction wheels 10 of an automotive vehicle. The system involves in its general organization a power plant which preferably, but not necessarily, is in the form of a conventional internal combustion engine 12 from which power may be selectively delivered to the wheels 10 for engine-to-wheel driving purposes through either or both of two power trains. As will be described in greater detail presently, one such power train which is designated by the bracket PTU is designed for use substantially exclusively when the vehicle is being operated in a generally intermittent fashion, as for example on city streets or in an unpredictable flow of heavy traffic, and the other power train which is designated by the bracket PTR is designed for use, largely, but not exclusively when the vehicle is travelling at relatively high speeds unobstructedly. For convenience of description herein, the former mode of vehicle operation will hereinafter be referred to as the urban mode of operation, while the latter mode of operation will subsequently be referred to as the rural mode of operation.

Establishment of the first power train PTU is effected under the control of two normally disengaged solenoid-actuated clutches 14 and 16, while establishment of the second power train PTR is effected under the control of a single normally disengaged solenoid-actuated clutch 18. Upon simultaneous engagement of both clutches 14 and 16 the first engine-to-wheel power train will be completed, such power train extending from the engine 12, through a transmission mechanism 20, the clutch 14, an energy storing flywheel 22, a second transmission mechanism 24, the clutch 16, and a differential mechanism 26 to the wheels 10. Upon energization of the clutch 18, the second engine-to-wheel power train PTR will be completed, this latter power train extending from the engine 12, through the transmission 20, clutch 18 and differential 26.

From the above description it will be apparent that the transmission 20 and differential 26 are common to both power trains. It will also be apparent that upon energization of the three clutches 14, 16 and 18, a division of output power from the transmission 20 will take place and both of the aforementioned power trains PTU and PTR will become effective to drive the wheels 10. However, this latter condition of dual power train drive is merely a physical or structural possibility which, in the exemplary form of the invention, if effected, would serve no useful purpose and the use of which is therefore not contemplated.

The first power train PTU is capable of three types of operation including a first type which is initiated by energizing the clutch 14 to the exclusion of the clutch 16, whereupon a power train component extending from the engine 12, through the transmission 20 and clutch 14 to the flywheel 22 will become effective to accelerate the flywheel. A second type of operation is initiated by engaging the clutch 16 and deenergizing the clutch 14, whereupon a power train component extending from the energy-storing flywheel 22 through the transmission 24, clutch 16, and differential 26 to the wheels 10 will be completed. The third type of operation of which the power train PTU is capable takes place when both clutches 14 and 16 are engaged so that all of the power train components are effective as previously described. When both clutches 14 and 16 are disengaged, the first power train PTU becomes disabled.

The power train PTR is capable of only one type of operation, such operation being initiated by engaging the clutch 18, whereupon such power train in its entirety becomes effective and the wheels 10 are driven directly from the transmission 20 as previously described. When the clutch 18 is disengaged, this power train becomes disabled. In the rural mode of operation, it is contemplated that although only one type of power train operation is possible as previously described, two phases of rural mode vehicle operation are contemplated. These include a high speed cruise phase which results when the power train PTU is disabled due to disengagement of the clutches 14 and 16 while the clutch 18 is engaged so as to render the power train PTR effective to drive the wheels 10 directly from the engine 12 as previously described, and secondly a flywheel assisted phase wherein the power train PTR remains effective to drive the wheels 10 while the clutch 14 is disengaged so as to disconnect the flywheel from the engine but the clutch 16 is engaged so that power can flow between the wheels 10 and the flywheel 22.

In the rural mode of vehicle operation, means are provided whereby either the engine 12, the flywheel 22, or both of these components may be employed for dynamic braking purposes. Accordingly, by causing the clutch 18 to become disengaged and the clutch 16 to be engaged at a time when vehicle speed has overrun flywheel speed, so to speak, flywheel lag or inertia may be used as a means for retarding vehicular speed. Where a relatively rapid reduction of vehicle speed is required, the clutch 18 may be energized in conjunction with the clutch 16 to attain dual braking, utilizing both the flywheel and engine as reaction components.

Figure 2:
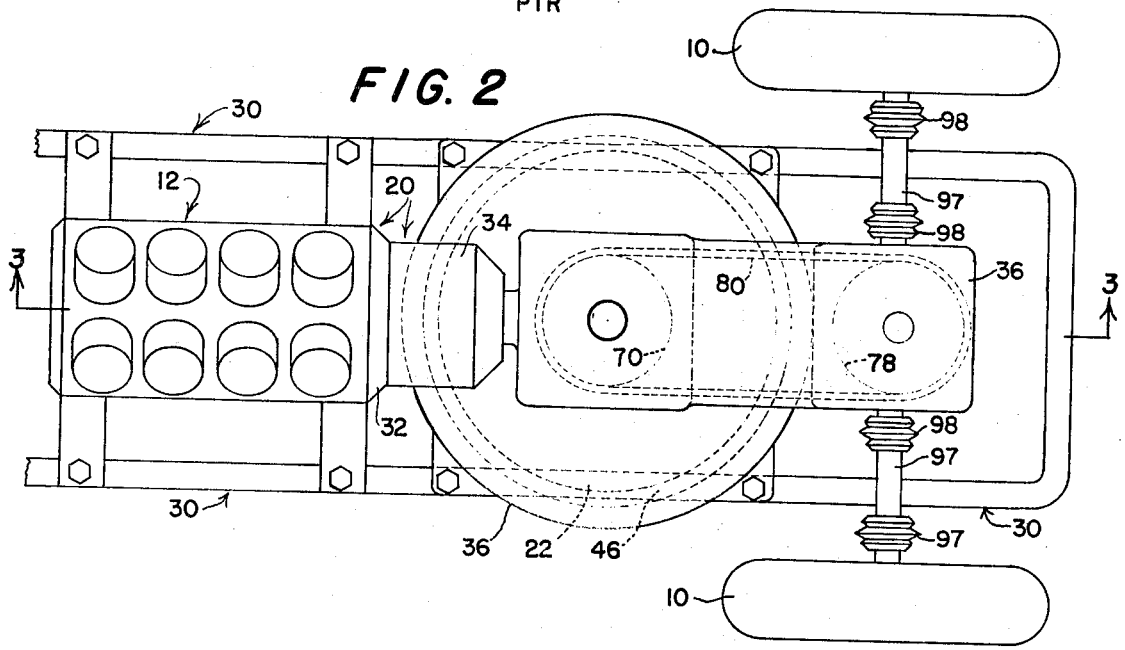
FIG. 2 is a plan view, largely schematic in its representation of an exemplary vehicle installed power system consistent with the broad system of FIG. 1.

It is to be distinctly understood that the block diagram of FIG. 1 is merely exemplary of the basic principles of the present invention and that the description of such diagram is not predicated upon the use of specific types or forms of power train components such as transmission and clutches. In FIGS. 2 and 3, a preferred embodiment of each of the power trains PTU and PTR is disclosed, the two power trains being effectively associated with each other to produce an operative vehicle propulsion system according to the present invention with the vehicle being shown only in schematic fashion. In these views and in the description thereof which follows, the propulsion system is illustrated and described as being semiautomatic in its operation, i.e. under the control of factors which are either manually initiated by the operator of the vehicle or are a result of automatic functions incident to vehicle speed, acceleration, throttle control and the like. The control circuitry for effecting such manual and automatic operations or functions have not been disclosed herein since they embody electrical, pneumatic and hydraulic components which are only indirectly related to the present invention.

Referring now additionally to FIGS. 2 and 3, an automotive vehicle chassis 30, which is tractionally supported by the wheels 10 and is associated with the internal combustion engine 12, represents a typical environment for the power system of the present invention. The engine 12 is of conventional construction and it has associated therewith the aforementioned transmission 20 which, in the preferred form of the invention herein disclosed may be comprised of a hydraulic torque converter section 32 and an automatic shift section 34, the lattere preferably, but not necessarily, being of a conventional three speed forward and one speed reverse type.

In the largely schematic illustration of FIGS. 2 and 3, the portions of the power trains PTU and PTR to the exclusion of the transmission 20 and differential 26, are shown as being operatively installed in a compartmented casing 36 which is mounted on the chassis 30, these portions including the two clutches 14 and 16, the flywheel 22, and the transmission 24 of the first power train PTU, and also the clutch 18 of the second power train PTR, together with certain compound gearing, shaft connections, bearing mounts and sealing devices, the nature of which will be made clear presently.

As best shown in FIG. 3, the transmission 20 is provided with an output shaft 40 which projects into a compartment 42 of the casing 36 and carries a bevel gear 44 which is associated with a gear cluster 45. The flywheel 22 is disposed within a hermetically sealed compartment or chamber 46 and is of a relatively massive nature. It is mounted on a flywheel shaft 48 which projects through the compartment 42 and has rotatably mounted thereon a second bevel gear 50 of the gear cluster 45 and which meshes with the bevel gear 44. The bevel gear 50 constitutes an element of a step-up planetary gearing arrangement 51 and is provided with a hub portion 52 which carries a series of circumferentially spaced planet gears 53, the latter meshing with a central sun gear 54 which is keyed to the flywheel shaft 48 and also with an outer reaction ring gear 56 which is rotatably mounted on the shaft 48. The aforementioned normally disengaged clutch 14 is associated with the ring gear 46 and when such clutch is engaged, the ring gear is held stationary so that rotation of the bevel gear 50 causes orbital movement of the planet gears 53 in such a manner that they roll around the ring gear 56 and transmit rotary motion to the flywheel shaft at an increased speed ratio relative to the rotation of the bevel gear 50, thus establishing the first type of operation of the power train PTU. When the clutch 14 is disengaged, the ring gear 56 idles and the flywheel shaft 48 receives no power from the bevel gear 50.

Still referring to FIGS. 2 and 3, the compartment 46 of the casing 36 constitutes a flywheel housing which is hermetically sealed by reason of a conventional seal 60 which cooperates with the flywheel shaft 48. The compartment or chamber 46 is adapted to be evacuated by means of a suitable nipple fitting 62 which may be connected by means of a flexible tube 64 to a vacuum pump (not shown), thus materially reducing air resistance against the flywheel.

The flywheel shaft 48 also projects across a compartment 63 of the casing 36 and constitutes the input element or member of the aforementioned transmission 24 which is wholly disposed within the compartment 63. This latter transmission is a step-down transmission and it involves in its general organization a planetary gearing arrangement 65 including a sun gear 66 which is keyed to the flywheel shaft 48, a plurality of circumferentially spaced planet gears 68 which are mounted on a carrier gear 70 rotatably mounted on the flywheel shaft 48, and a ring gear 72 having a hub portion 74 rotatably mounted on the shaft 48. A shaft 76 extends across the compartment 64 and carries a gear 78 which is operatively connected in driven relationship to the gear 70 by a cog belt 80. A variable speed drive mechanism 81 which may be of the Reeves type is effective between the shaft 76 and the ring gear 72 and includes the usual variable pitch split pulley 82 which is operatively disposed on the shaft 76, and a cooperating split pulley 84 which is rotatably supported on the flywheel shaft 48 but is operatively connected to the hub 74 of the ring gear 72 for rotation in unison therewith. A belt 85 extends between the two pulleys 82 and 84. The effective drive ratio of the mechanism 81 is adapted to be regulated under the control of a reversible electric motor M1 on the casing 36 and having a control shaft 87.

The aforementioned clutch 16 of the power train PTU is operatively associated with the shaft 76, one end of such shaft projecting into a compartment 86 of the casing 36. The projecting end of the shaft 76 carries a bevel gear 90 which forms an element of a gear cluster 91. The clutch 16 serves to releasably couple the bevel gear 90 to the shaft 76. A second bevel gear 92 meshes with the gear 90 and also with a third bevel gear 94, thus completing the gear cluster. The bevel gear 94 is mounted on the input shaft 96 of the differential 26. As shown in FIG. 2, the differential output shafts are in the form of the usual split axles 97 which extend to the wheels 10 and have associated therewith flexible universal joint boots 98. In order to correlate the various elements of FIG. 3 with the block diagram of FIG. 1, it is pointed out that the power train PTU which is identified by the bracket in FIG. 1 is comprised of the torque converter and automatic shift section 32, 34 of the transmission 20, the bevel gears 44 and 50, the planetary gearing arrangement 51, the clutch 14, the flywheel shaft 48, the planetary gearing arrangement 65, the gears 70 and 78 and their associated cog belt 80, the variable speed mechanism 81, the shaft 76, the clutch 16, and the gear cluster 91 which is connected to the input shaft 96 of the differential 26.

The bevel gear 92 of the gear cluster 91 is mounted on a split shaft 100, the sections of which are connected together by a coupling member 102. The aforementioned clutch 18 serves to releasably couple the bevel gear 92 to the shaft 100. The shaft 100 carries a second bevel gear 104 which constitutes an element of the gear cluster 45 and which meshes with the bevel gear 50 so that the shaft 100 is at all times operatively connected to the output shaft 40 of the transmission 20. In order to correlate the disclosure of FIG. 3 with the block diagram of FIG. 1, it is pointed out that the power train PTR, which is identified by the bracket of FIG. 1, is comprised of the torque converter and automatic shift sections 32, 34 of the transmission 20, the entire gear cluster 45, the split shaft 100 and its coupling 102, the clutch 18, and the bevel gears 92 and 94.

It has been stated previously in connection with the block diagram of FIG. 1 that the power train PTU is capable of three types of operation, the first type being effective when the clutch 14 is engaged and the clutch 16 is disengaged, thus resulting in a direct drive between the transmission 20 and the flywheel, the second type being effective when the clutch 14 is disengaged and the clutch 16 is engaged, thus resulting in a direct drive between the flywheel and the vehicle wheels 10, and the third type being effective when both clutches 14 and 16 are engaged so that a direct drive between the transmission 20 and the flywheel 22 and also between the flywheel and the vehicle wheels. These three types of power train operation are readily ascertainable with reference to FIG. 3 wherein it will be observed that the first type of operation which is incident to engagement of the clutch 14 connects the transmission 20 to the flywheel through the medium of the bevel gears 44, 50, and planetary gearing arrangement 51 while the flywheel is disconnected from the differential 26 since the clutch 16 is disengaged so that the shaft 76 is not connected to the gear cluster 91 which, in effect, constitutes a differential input. The second type of operation of the power train PTU connects the flywheel to the differential by reason of the fact that the clutch 16 connects the shaft 76 to the gear cluster 91 leading to the differential 26, while the clutch 14 releases the planetary gear arrangement 51. The third type of operation wherein both clutches 14 and 16 are engaged operatively activates both planetary gearing arrangements 51 and 65 so that the transmission 20 is connected to the flywheel 22 and the latter is connected to the differential 26, the connections being subject, of course, to the normal operation of the aforementioned manual and automatic control functions incident to engine speed, flywheel speed, ignition circuit interruption, etc.

Insofar as the power train PTR is concerned, its operation may be ascertained with reference to FIG. 3 wherein it will be appreciated that with the clutch 18 disengaged the split shaft 100 is disconnected from the differential 26 so that there will be no exchange of power between the gear cluster 45 and the differential 26. Upon engagement of the clutch 18, with the clutches 14 and 16 being disengaged, the clutch 18 becomes effective to operatively connect the gear clusters 45 and 91 for power flow between the transmission 20 and the differential 26.

When considering the operation of the herein described propulsion system, it should be borne in mind that the functioning of the various components of the system, although largely a result of the selective actuation of the three solenoid-actuated clutches 14, 16 and 18, is also a result of numerous other control functions which take place automatically and which are dependent upon a wide variety of factors such as opening and closing of the engine ignition circuit, engine speed setting as determined by the displacement of the operator's foot pedal, actual engine speed, engine manifold vacuum, actual vehicle speed, as well as relative speed ratios which prevail among the variable speed components of the system. Additionally, various overriding manually operable control means and also signaling or indicating devices are contemplated. These control instrumentalities and devices, whether manual or automatic have not been disclosed herein since they do not form a part of the present invention.

In the operation of the propulsion system, and assuming that it is desired that the system shall initially function in the urban mode of vehicle operation, the operator will effect engagement of the clutch 14, thus conditioning the system for operation in such urban mode. This clutch engagement may be effected by causing the solenoid winding W1 of the clutch 14 to be disposed in the ignition circuit so that by the simple expedient of energizing such ignition circuit the clutch will automatically become engaged. With the clutch 14 thus engaged, opening of the engine throttle will actuate the automatic transmission 20 in the usual manner so that the gear ratios are smoothly and automatically changed, during which time the flywheel 22 is brought to a predetermined maximum speed which, for exemplary purposes may be 24,000 rpm although other speeds are contemplated. At such time as this predetermined maximum speed has been attained the ignition circuit is interrupted, thus allowing the clutch 14 to become disengaged. During such flywheel acceleration the power train PTU functions as previously described to produce the first type of power train operation wherein power is applied only to the flywheel 22 and not to the vehicle wheels 10.

After the predetermined maximum flywheel speed has been attained and the ignition circuit interrupted so as to disable the engine 12 and disengage the clutch 14, the clutch 16 is caused to become engaged. This may be accomplished by causing energization of the solenoid winding W2 under the influence of a speed control pedal. Such energization of the clutch 16 conditions the power train PTU for its second type of operation as previously described wherein power is applied by the flywheel to the differential 26 and the engine 12, now stationary, is disconnected from the flywheel.

At this time the kinetic energy of the rapidly rotating flywheel 22 is capable of driving the vehicle at a relatively high speed and for a prolonged period of time. This second type of power train operation remains prevalent during operation of the vehicle within a predetermined speed range, for example below a speed of 60 mph, during which time the reversible control motor M1 is actuated under the control of the operator's foot pedal or otherwise, to varying the speed ratio of the variable speed drive mechanism 81 and thus regulate the speed of the now flywheel-driven vehicle.

This second phase of urban mode operation of the vehicle may prevail for a relatively long period of time and its duration is a function of the ability of the flywheel 22 to exceed a predetermined minimum speed which may be on the order of 12,000 rpm. At such time as flywheel speed is reduced to this minimum speed, the clutch 14 will become engaged while the clutch 16 remains engaged, thereby restoring that portion of the power train PTU which established a connection between the transmission 20 and the flywheel 22 so as to again accelerate the flywheel, while at the same time continuing to derive vehicle propulsion power from the flywheel, utilizing the reversible speed ratio controlling electric motor M as heretofore described for vehicle accleration and deceleration purposes. During such time as both clutches 14 and 16 remain engaged the planetary gearing 51 is effective to transmit power to the flywheel from the transmission 20 and the transmission 24 including the planetary gearing 65 is effective to transmit power to the gear cluster 91 for differential input purposes, the third type of operation of the power train PTU thus being prevalent. It will be understood, of course, that after the flywheel 22 has been restored to its predetermined maximum speed the clutch 14 will again be disengaged to restore the power train PTU to its second type of operation.

It is to be noted that when operating the vehicle in the urban mode with the power train PTU conditioned for either its second or third type of operation as previously described, dynamic braking of the vehicle is initiated at any time that vehicle deceleration takes place consistent with the speed of the flywheel 22. Inasmuch as with either of these types of power train operation the flywheel 22 and differential 26 are relatively connected together in driving relationship, vehicle deceleration returns power to the flywheel and accelerates the same. Where flywheel speed is not consistent with such dynamic braking, various torque-responsive and other automatic control devices not disclosed herein regulate the flow of power both in the proper direction and amount.

Assuming now that the system shall function in the rural mode of power train operation, the operator will cause the clutch 18 to become engaged to the exclusion of the clutches 14 and 16. With the clutches 14 and 16 disengaged, the entire power train PTU is disabled, while with the clutch 18 engaged, the split shaft 100 functions generally in the manner of a conventional vehicle drive shaft to drive the vehicle wheels directly from the transmission 20. This mode of vehicle operation may be maintained by the operator at his discretion and it enables the vehicle to be started from a position of rest even when the flywheel 22 is stationary.

Except for the purpose of effecting an initial or immediate acceleration of the vehicle from a position of rest when the flywheel 22 is stationary, and since there is no benefit to be gained by operating the system in the rural mode at low speeds, the operator will seldom use such mode when the urban mode is available for starting or for acceleration. Operation of the vehicle in the rural mode is otherwise reserved for use when the vehicle is traveling at relatively high speeds on open highways for example and in a cruising range on the order of from 60 mph and upwards. In this range, regardless of the particular speed which obtains, the clutch 18 remains engaged so that the entire power train PTR remains effective between the transmission 20 and the differential 26. However, at such time as vehicle speed falls appreciably below the aforementioned 60 mph, the clutch 16 may be engaged so that that portion of the power train PTU which includes the transmission 24 and its associated planetary gearing arrangement 65, the shaft 76 and the gear cluster 91 will become effective between the flywheel 22 and differential 26 in either direction for vehicle propulsion or dynamic braking as previously described. With this type of flywheel-assist vehicle operation, since the clutch 14 remains disengaged, engine power is directed to the vehicle wheels but not to the flywheel.

The invention is not to be limited to the exact arrangement of parts shown in the accompanying drawings or described in this specification as various changes in the details of construction may be resorted to without departing from the spirit of the invention. For example, whereas the power trains PTU and PTR have been shown herein as being comprised of specific components such as gear clusters, planetary gearing units or arrangements, variable pitch and other pulley mechanism, etc., it is within the purview of the present invention to substitute other functionally equivalent components if desired. Furthermore, although these components have been illustrated as being operatively associated with one another by reason of a common compartmented casing which is supported by the vehicle chassis or frame, it is obvious that if desired these components may be otherwise operatively associated with one another on the vehicle framework, above or below the level thereof and at any desired location therealong. Therefore, only insofar as the invention has particularly been pointed out in the accompanying claims, is the same to be limited.

Having thus described my invention, what I claim and desire to secure by letters patent is:

1. In an automotive vehicle, a hybrid vehicle propulsion system comprising a traction driving wheel, an energy-producing engine, a rotatable energy-storing flywheel, a first power train including a first variable speed power transmission, said first power train extending between said engine and flywheel, a second power train including a second and continuously variable speed transmission, said second power train extending between said flywheel and traction wheel, a third power train extending between said engine and traction wheel, a first clutch interposed in said first power train and effective when engaged to connect the first transmission to the flywheel in driving relationship for flywheel acceleration purposes, a second clutch interposed in said second power train and effective when engaged to connect the second transmission to the traction wheel in driving relationship, and a third clutch interposed in said third power train and effective when engaged to connect said first transmission to said traction wheel in driving relationship.

2. A vehicle propulsion system as set forth in claim 1 and including, additionally, gearing interposed in said first power train between said engine and first clutch and normally effective to establish an increased speed ratio drive between the engine and flywheel.

3. A vehicle propulsion system as set forth in claim 1, wherein said gearing is of the planetary type and said first clutch provides reaction torque for said planetary gearing.

4. A vehicle propulsion system as set forth in claim 1, wherein said second transmission consists of planetary gearing, and means are provided for controlling the speed ratio of said latter transmission.

5. A vehicle propulsion system as set forth in claim 4, wherein said means for controlling the speed ratio of said transmission comprises a split pulley and belt mechanism.

6. In an automotive vehicle, a hybrid vehicle propulsion system comprising a traction driving wheel, an energy-producing engine, a rotatable energy-storing flywheel, a first power train including a first variable speed transmission, said first power train extending between said engine and flywheel, a second power train including a second and continuously variable speed transmission, said second power train extending between the flywheel and traction wheel, a third power train including said first transmission, said third power train extending between said engine and traction wheel, a first clutch interposed in said first power train and effective when engaged to connect the first transmission to the flywheel in driving relationship for flywheel acceleration purposes, and a second clutch interposed in said second power train and effective when engaged to connect said second transmission to the traction wheel in driving relationship.

7. The method of propelling a vehicle of the type having an energy-producing engine, an energy-storing flywheel, and a traction wheel, said method comprising the steps of starting the engine and causing the same to operate substantially at the minimum brake specific fuel consumption point and to continuously supply power to said flywheel to drive the same and store energy therein and, while maintaining such supply of power to the flywheel regardless of flywheel speed, withdrawing portions of such stored energy from the flywheel and applying the same to the traction wheel for propulsion purposes.

8. The method of propelling a vehicle as set forth in claim 7 including the further steps of discontinuing operation of the engine when flywheel speed has attained a predetermined maximum while continuing to withdraw portions of the stored energy from the flywheel and applying the same to the traction wheel for propulsion purposes, and of restarting the engine when flywheel speed has dropped to a predetermined minimum and again causing the engine to operate at substantially the minimum brake specific fuel consumption point.

* * * * *